Patented July 16, 1935

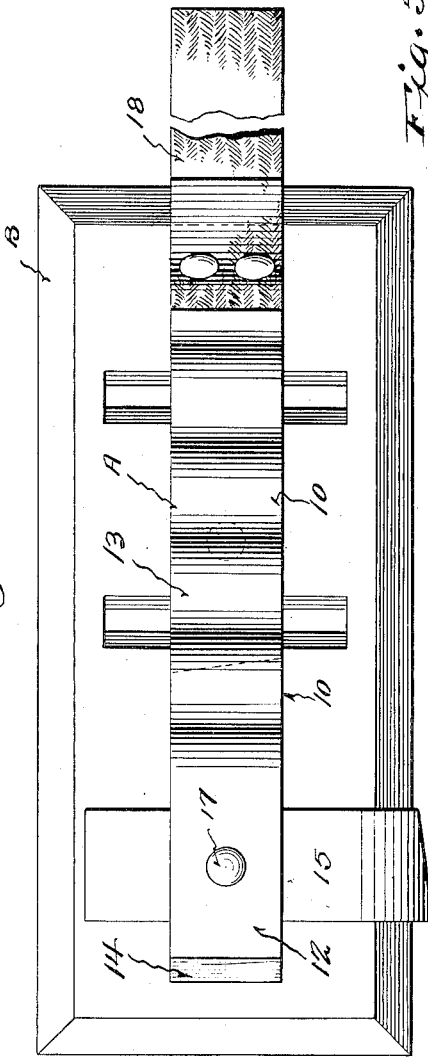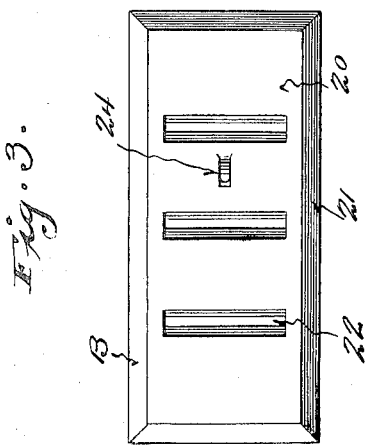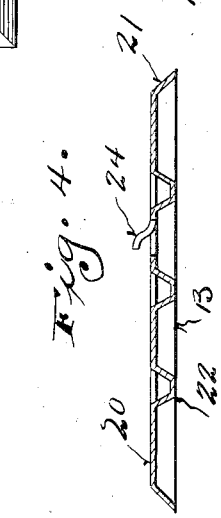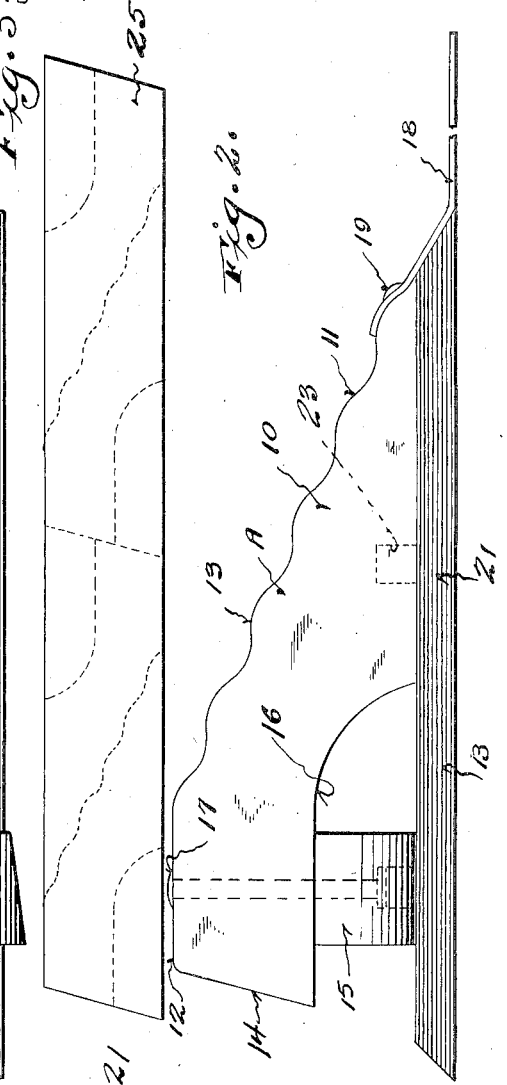

2,008,394

UNITED STATES PATENT OFFICE 2,008,394

VEHICLE JACK APPLIANCE

Maurice B. Hull, West Allis, Wis.

Application August 11, 1934, Serial No. 739,385

2 Claims. (Cl. 254—88)

This invention appertains to motor vehicles, and more particularly to a novel appliance therefor.

With the use of balloon and so-called "doughnut" tires considerable difficulty is experienced in placing a jack under the vehicle frame to elevate the same when a flat occurs. This is due to the small space left between the frame and the ground. In some instances it is utterly impossible to place the jack in position at all.

Therefore, one of the salient objects of my invention is to provide a novel device for increasing the distance between the ground and the frame of the vehicle at the wheel where the flat has occurred, so that the standard jack can be easily and quickly placed in position for further elevating the frame to permit the deflated tire to be removed.

Another important object of my invention is the provision of a wedge block, or incline, adapted to be placed on the ground and in contact with the wheel having the deflated tire, so that when the vehicle is started, the wheel having the flat tire will ride up on the wedge, or incline, and thus effectively increase the distance of the frame from the ground for the reception of the jack.

A further important object of my invention is the provision of a novel appliance for use in conjunction with motor vehicles embodying a solid block of hard wood or the like, having an inclined face to permit the wheel of a vehicle to ride up on the block when the vehicle is started, the block having a novel swinging foot normally positioned within the planes of the side walls of the block when the block is not in use, and adapted to be swung at right angles to the block when the block is in use to effectively prevent the tilting of the block as the wheel rides up thereon.

A further important object of my invention is the provision of novel means for forming a plurality of blocks with their swinging feet from a length of timber without any waste, whereby the blocks can be economically manufactured and placed upon the market at a small cost, the formation of the blocks being such that a plurality of the blocks can be conveniently packed in a small package.

A further object of my invention is the provision of a supplemental platform for connection with the block for increasing the base area of the block when the same is used on soft ground and the like, whereby the block will not be readily forced into the ground.

A still further object of my invention is to provide a novel motor vehicle appliance of the above character, which will be durable and efficient in use, and one that can be conveniently carried in the vehicle without occupying much space.

With these and other objects in view, the invention consists in the novel construction, arrangement and formation of parts, as will be hereinafter more specifically described, claimed and illustrated in the accompanying drawing, in which drawing:—

Figure 1 is a top plan view of the improved block, showing the same used in connection with the supplemental base.

Figure 2 is a side elevation of my improved block, showing the same used with the supplemental base.

Figure 3 is a top plan view of the supplemental base, the view being taken on a reduced scale.

Figure 4 is a longitudinal section through the same.

Figure 5 is a side elevation of a length of timber, showing the novel means of forming a plurality of blocks therefrom without waste, the view being also taken on a small scale.

Referring to the drawing in detail, wherein similar reference characters designate corresponding parts throughout the several views, the letter A generally indicates my improved automobile appliance, and B the supplemental base which can be used therewith.

My improved appliance A comprises a solid body 10 formed from hardwood or the like, and the upper face thereof is provided with a downwardly and forwardly inclined surface 11, which leads to a top substantially horizontally disposed wall 12, upon which the deflated tire is adapted to rest when the wheel is elevated by riding up the inclined face 11. If preferred, the inclined face 11 can be corrugated or provided with transverse ridges 13 to facilitate traction between the tire and the block.

The lower face of the block is left flat for engagement with the ground, and it is to be noted that the rear end of the block also preferably inclines downwardly and rearwardly, as at 14, so as to increase the base area of the block.

One of the salient features of my invention is the provision of the novel swinging foot 15, which is employed for preventing lateral tilting of the block when the same is in use. The swinging foot 15 is cut directly out of the rear lower corner of the block, which forms a cavity, or notch, 16, in which the foot normally fits when the block is not in use. Thus, the foot 15 is not only economically formed, but the same will lie within the plane of the side walls of the block when the same is not in use.

A bolt 17 can be employed for connecting the foot with the rear end of the block, and the bolt can extend entirely through the block and the foot. This provides a simple but efficient means for connecting the foot with the block for turning movement.

When the block is in use the foot is turned at right angles thereto (as shown in Figures 1 and 2), and thus the foot will resist lateral tilting movement of the block.

A length of fabric 18 can be secured to the front edge of the block, as at 19, and this prevents the slipping of the block away from the wheel as the wheel approaches the block.

In use of my improved device, should a flat occur and should the frame of the car be lowered to such an extent thereby that a jack cannot be placed under the frame, the block is placed in front of or in rear of the wheel carrying the deflated tire, with the strap lying in the path of the tire.

The foot 15 is now turned at right angles, as shown in the drawing, and the vehicle is driven backward or forward as the case may be (depending on the position of the block), and the wheel will ride up on the block. This will effectively raise the wheel and the frame to such a height that the conventional jack can be placed under the frame and thus permit the easy raising of the frame to permit the removal of the tire. Obviously, when the wheel is elevated by the jack the block is removed.

In some instances, such as when the block is used in soft or sandy soil, it may be advisable to use an additional base in conjunction with the block, and hence I have provided the novel base B.

This base B is preferably formed from sheet metal and includes a top plate 20 and outwardly flared marginal flanges 21. The plate can be reinforced by struck-out ribs 22, the lower faces of which are flattened for engagement with the ground. The length of the base is substantially the same as the length of the block, but the width of the base is considerably greater than the width of the block.

As shown in Figure 2, the block can be placed directly on the upper surface of the base at the longitudinal center thereof, with the lower inclined edge of the block directly in rear of the front flange 21.

In order to couple the block with the base, the block can be provided with a socket 23 into which is adapted to fit a struck-out tongue 24 formed on the top wall, or plate, 20 of the base.

The blocks are so designed that the same can be economically manufactured and so that the same will readily pack for shipment and occupy a minimum amount of space.

In Figure 5 I have illustrated the means of forming a plurality of blocks from a single length of timber 25 without waste. The dotted lines on the piece of timber indicate the manner in which the blocks can be cut therefrom.

Changes in details may be made without departing from the spirit or the scope of this invention, but what I claim as new is:—

1. An attachment for motor vehicles comprising, a block formed from a solid piece of material having a bottom flat face and an upper inclined face, the lower rear corner of the block having a notch cut therein, and a vertically disposed swinging foot mounted in said notch adapted to normally lie within the notch and flush with the sides of the block when the same is not in use, the foot being movable at right angles to the block with its ends beyond the sides of the block when the block is in use for preventing lateral tilting thereof.

2. An attachment for motor vehicles comprising a wedge having a flat lower face and an inclined upper face, means preventing lateral tilting of the wedge when the same is in use, a supplemental base for receiving the wedge having a width greater than said wedge, and a struck-up tongue formed on the base, the lower face of said wedge having a recess therein receiving said tongue to detachably connect the wedge and the base together against relative movement when the wedge is in use.

MAURICE B. HULL.